United States Patent
Wurch et al.

(10) Patent No.: US 7,177,952 B1
(45) Date of Patent: Feb. 13, 2007

(54) METHOD AND SYSTEM FOR SWITCHING BETWEEN TWO NETWORK ACCESS TECHNOLOGIES WITHOUT INTERRUPTING ACTIVE NETWORK APPLICATIONS

(75) Inventors: Donald L. Wurch, Rockwall, TX (US); Liem Q. Le, Richardson, TX (US); Carey B. Becker, Plano, TX (US); Emad A. Qaddoura, Plano, TX (US); Russ C. Coffin, Plano, TX (US)

(73) Assignee: Nortel Networks Limited, St.Laurent (CA)

( * ) Notice: Subject to any disclaimer, the term of this patent is extended or adjusted under 35 U.S.C. 154(b) by 649 days.

(21) Appl. No.: 09/631,251

(22) Filed: Aug. 2, 2000

Related U.S. Application Data

(60) Provisional application No. 60/157,289, filed on Oct. 1, 1999.

(51) Int. Cl.
*G06F 15/16* (2006.01)
(52) U.S. Cl. ............... 709/250; 709/245; 709/249
(58) Field of Classification Search ........... 709/105, 709/236–242, 245, 248–250
See application file for complete search history.

(56) References Cited

U.S. PATENT DOCUMENTS

| | | | | |
|---|---|---|---|---|
| 5,428,671 | A * | 6/1995 | Dykes et al. | 379/93.32 |
| 5,539,744 | A * | 7/1996 | Chu et al. | 370/397 |
| 5,717,737 | A | 2/1998 | Doviak et al. | 455/403 |
| 5,757,924 | A * | 5/1998 | Friedman et al. | 713/151 |
| 5,918,021 | A * | 6/1999 | Aditya | 709/235 |
| 6,064,649 | A * | 5/2000 | Johnston | 370/310.2 |
| 6,137,802 | A * | 10/2000 | Jones et al. | 370/401 |
| 6,151,297 | A * | 11/2000 | Congdon et al. | 370/216 |
| 6,198,920 | B1 | 3/2001 | Doviak et al. | 455/426 |
| 6,240,513 | B1 * | 5/2001 | Friedman et al. | 713/152 |
| 6,314,525 | B1 * | 11/2001 | Mahalingham et al. | 714/4 |
| 6,377,992 | B1 * | 4/2002 | Plaza Fernandez et al. | 709/250 |
| 6,393,483 | B1 * | 5/2002 | Latif et al. | 709/226 |
| 6,490,632 | B1 * | 12/2002 | Vepa et al. | 709/250 |
| 6,516,352 | B1 * | 2/2003 | Booth et al. | 709/250 |
| 6,590,861 | B1 * | 7/2003 | Vepa et al. | 370/216 |

FOREIGN PATENT DOCUMENTS

| | | |
|---|---|---|
| EP | 0891061 A2 | 1/1999 |
| EP | 0998094 A2 | 5/2000 |

OTHER PUBLICATIONS

Baker et al., "Supporting Mobility in MosquitoNet", Proceedings of the Usenix 1996 Annual Technical Conference, Online! Jan. 22-26, 1996, San Diego, California, pp. 127-139.

* cited by examiner

*Primary Examiner*—Glenton B. Burgess
*Assistant Examiner*—Yasin Barqadle
(74) *Attorney, Agent, or Firm*—Hayes and Boone, LLP

(57) ABSTRACT

A system and method is provided for seamlessly switching between different network access technologies without interrupting active network applications or sessions. A Network Access Arbitrator (NAA), which contains a virtual network adapter driver, resides between a Data Link Layer and a Network Layer of the standard OSI-7 Layer Protocol Stack for controlling necessary switching between different network access technologies. Since all network applications are controlled by layers residing on or above the Network Layer, all applications using network services provided by the Network Layer will continue their active network sessions or applications without disruption, as the NAA switches between different network access technologies.

15 Claims, 2 Drawing Sheets

METHOD AND SYSTEM FOR SWITCHING BETWEEN TWO NETWORK ACCESS TECHNOLOGIES WITHOUT INTERRUPTING ACTIVE NETWORK APPLICATIONS

CROSS REFERENCE

This application claims the benefit of a U.S. Provisional Application Ser. No. 60/157,289, entitled "Network Access Arbitrator" which was filed on Oct. 1, 1999.

BACKGROUND OF THE INVENTION

The present invention relates generally to communication network access technologies, and more particularly, to a system and method for providing transparent and automatic switching between different network access technologies without interrupting active network applications or sessions.

The advent of computer networks has brought a revolutionary change to the world about how people work with computers in their daily activities. Networked computers allow users to share various computer resources and provide significant conveniences to users. Various network access technologies (NATs) are co-existing today that provide users with different network design alternatives. For example, Token Ring, Ethernet, and Wireless Local Area Network are all well known network access technologies that are widely used. Therefore, it is very likely that multiple networks using different network access technologies are located side by side in a larger network that services, for example, a large company.

This co-existence of different network access technologies brings problems and undesired delays when a user switches from one part of a network to another if each part uses different access technologies. For example, it is possible that a user's laptop is equipped with one Ethernet card and one wireless LAN PCMCIA card for providing two alternate network accesses to a corporate network. For example, consider a user in the middle of an active network session, such as downloading a lengthy file via Ethernet access in the user's office, and the user must go to a meeting with his colleagues in another building and must bring the file with him. If he has to wait for the file to be completely downloaded, he may be late for the meeting. Alternatively, the user can terminate the downloading session and download the same file all over again at the meeting where he reestablishes a network connection (either through another Ethernet connection in the meeting room or through the wireless LAN PCMCIA connection on his laptop). Both choices are not desirable because either the user is delayed or he has to waste whatever has been downloaded before he leaves his office.

When a user has to disconnect from a network while using a particular NAT and reestablish another network connection through a different NAT, certain processes must happen. In any network that is in conformance with the standard Open Systems Interconnection (OSI)-7 Layer model, all activities in different layers must be terminated.

Referring now to FIG. 1, an overall schematic for the standard OSI-7 Layer Protocol Stack 10 is shown. The concept of layering is generally known in the art and the OSI standard is the only internationally accepted framework of standards for communication between different system made by different vendors. The OSI-7 Layer Protocol Stack 10 typically has seven different layers: a Physical Layer (L1) 12, a Data Link Layer (L2) 14, a Network Layer (L3) 16, a Transport Layer (L4) 18, a Session Layer (L5) 20, a Presentation Layer (L6) 22 and an Application Layer (L7) 24. As shown in FIG. 1, L1 deals with the physical means of transmitting data over communication lines, and in a network environment, usually refers to various Network Interface Cards (NICs) 26 designed for different NATs. L2 is concerned with procedures and protocols for operating the communication lines, and in this example, is the corresponding Adapter Driver Software 28 for various NICs. In order to identify each NIC, usually a Data Link Layer address or an L2 address is assigned to the NIC. L3 provides information 30 about how data packet routing and relaying can be accomplished. This information may include network or Internet Protocol addresses for communication nodes such as a file server or other computers. L4 defines the rules for information exchange, e.g., information about various network protocols 32 such as TCP/IP protocols, UDP, or ICMP, L5, L6 and L7 are dedicated more to network applications 34. All these layers are working together on a computer hardware platform 36 such as a host computer server.

Now referring to FIG. 2, a flow diagram 40 is shown for terminating a first network access with a first NAT and switching to a second network access with a second NAT, all while active network applications are in progress. When terminating the first network access, the active network applications are interrupted. From the perspective of layering, the active network applications relating to L5, L6 and L7 are first shut down in step 42. Then the corresponding network connections (relating to L4 and L3) are destroyed in step 44. Eventually network software and hardware in L2, L1 and the computer platform are reconfigured in step 46. Using the new NAT, network connections must be initiated in step 48, and the network applications must be restarted again in step 50. In summary, the conventional techniques for switching from the first NAT to the second NAT tears down all processes from L7 downward to L1, and then re-establishes the applications back from L1 upward to L7. This lengthy process incurs extra delays and expenses for network computing and greatly reduces the efficiency of network applications.

What is needed is a method and system to switch between different network access technologies without interrupting active network applications or sessions.

SUMMARY OF THE INVENTION

A system and method is provided for seamlessly switching between different network access technologies without interrupting active network applications or sessions.

Using as an example the standard OSI-7 Layer Protocol Stack to implement network communications, one embodiment of the present invention provides a Network Access Arbitrator (NAA). The NAA is a virtual network device driver situated between the Data Link Layer (L2) and the Network Layer (L3) of the OSI-7 Layer Protocol Stack for controlling necessary switching between different network access technologies. Since all computer network applications are controlled by layers residing on or above L3, all applications using network services provided by L3 (connection or connectionless) will continue their active network sessions without disruption, as the NAA switches between network access technologies.

In addition to providing switching between different network access technologies, the NAA also works in conjunction with Mobile Internet Protocol functions such as IP-in-IP encapsulation/de-capsulation, proxy ARP, gratuitous ARP, etc.

DESCRIPTION OF THE PREFERRED EMBODIMENT

Figure 1:
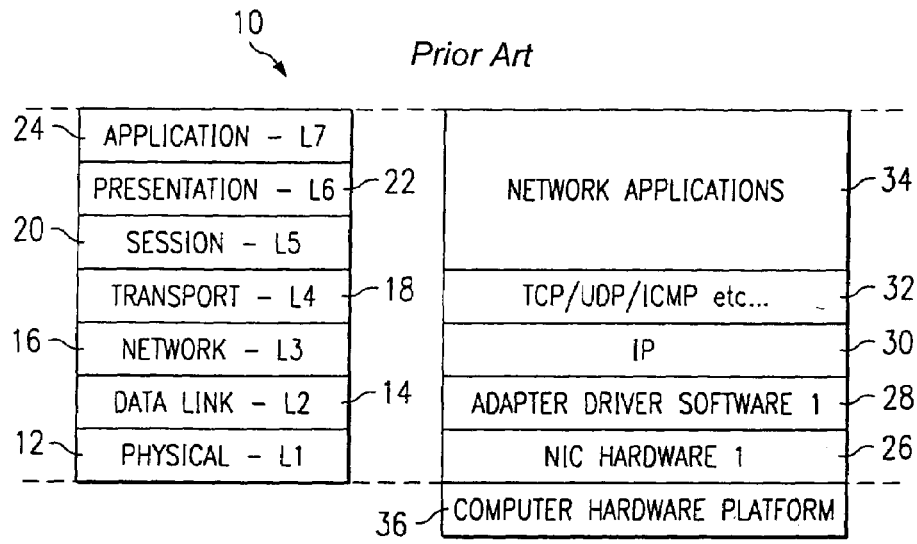
FIG. 1 illustrates an overview of the standard OSI-7 Layer Protocol Stack.
Figure 2:
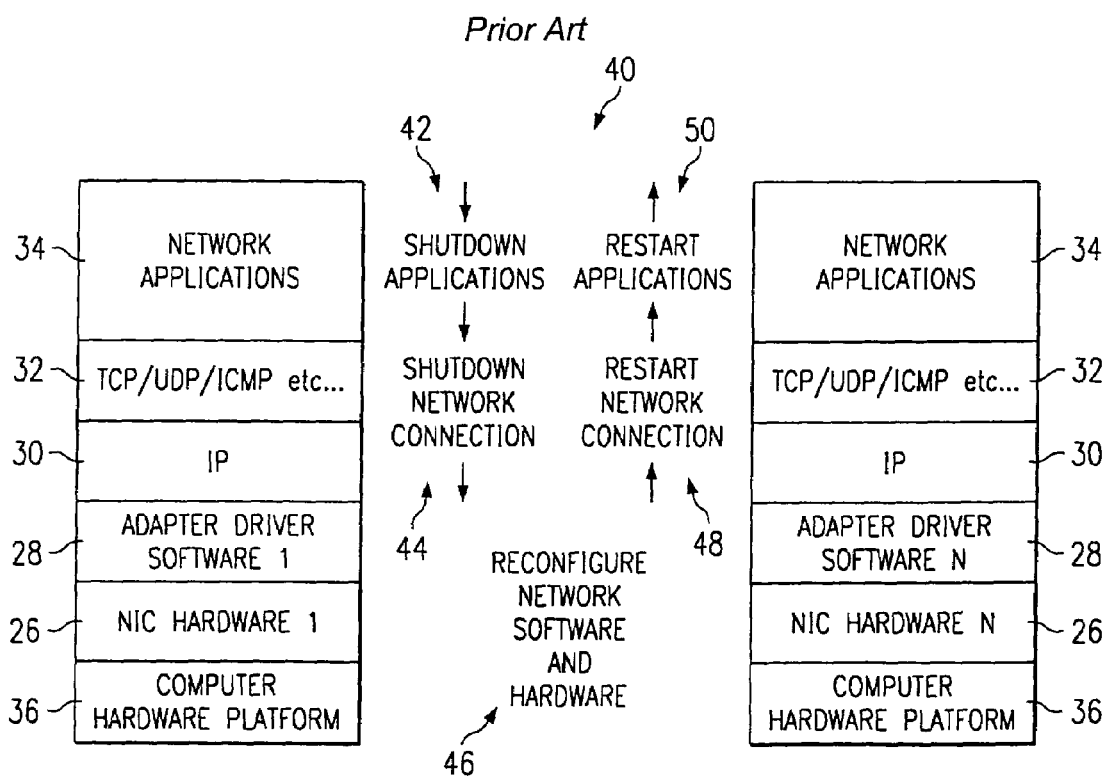
FIG. 2 illustrates a process flow for switching between two different network access technologies.
Figure 3:
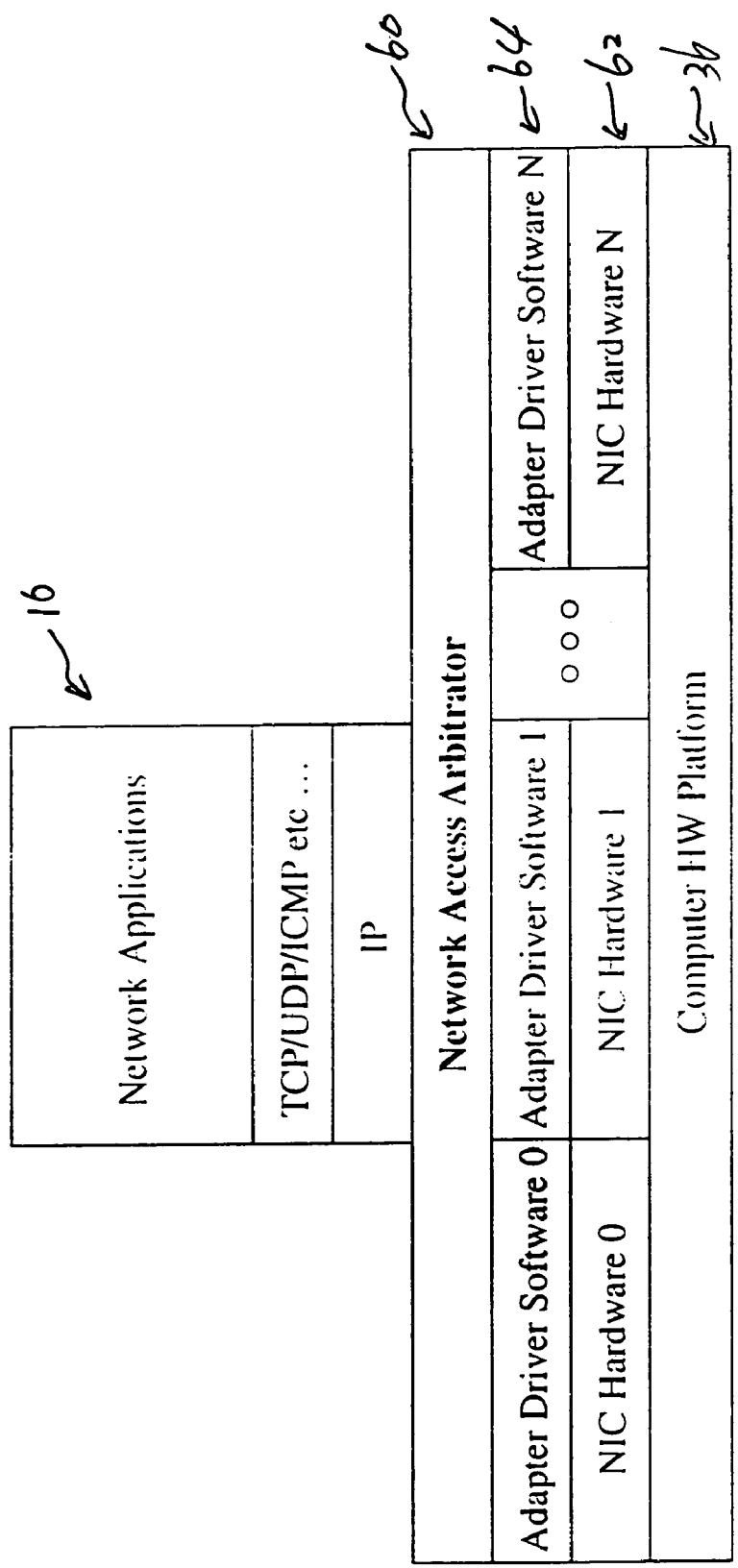
FIG. 3 is a graphical representation of how a Network Access Arbitrator interacts with different Layers of the OSI-7 Layer Protocol Stack in accordance with one embodiment of the present invention.

Referring now to FIG. 3, a Network Access Arbitrator (NAA) 60 is shown in the environment of an OSI-7 Layer Protocol Stack 10 according to one embodiment of the present invention. The NAA 60 is a virtual adapter driver located between L2 and L3 for providing seamless network hand-offs between two different network access technologies (NATs). With the implementation of the NAA 60, various active network applications are uninterrupted as the NAA 60 stops exchanging information through an existing NAT and moves over to use a new NAT.

On a computer hardware platform 36 such as a host computer server on L2, there are multiple NATs available, e.g., multiple network interface cards (NICs) 62 along with their corresponding adaptive driver software (NIC 0 to NIC N). The NAA 60 is inserted in between L2 and L3. The NAA 60 insures that L3 detects only a virtual Anchor Adapter driver (Anchor) even though there are multiple NICs 62 and adapter drivers installed on the computer platform 36. Therefore, all the processes on and above L3 are not aware of different NICs 62 and adapter drivers 64.

Out of all the available adapters or NICs 62 on the computer platform, one particular NIC can be initially set as a primary adapter. Its driver thus is the primary adapter driver. All the other adapters and their corresponding drivers are considered non-primary or secondary. Initially, the primary adapter driver is the Anchor.

When executing a network application, the primary adapter is usually the one for providing the network access. At any moment, only one of the adapters or NICs is active. However, due to the availability of multiple NATs, the active network adapter may or may not be the primary adapter. The active adapter receives and transmits all Internet Protocol (IP) data packets including those in unicast, multicast, and broadcast format. However, inactive adapters will receive only multicast and broadcast packets. Moreover, the NAA 60 monitors all the adapters 62, and receives and transmits data packets only through the active adapter. Since the NAA 60 is situated between L2 and L3, all network applications or communications using L3 network protocols deal exclusively with the NAA 60 without directly involving any L2 network components. In other words, without letting L3 know which adapter driver in L2 and its associated active adapter in L1 is actually used, the NAA 60 supplies/retrieves data packets to/from the active adapter, whether it is the primary adapter or any other one connected to the same host computer hardware platform. Therefore, an active network application that works with L3 network protocols observes a constant data stream coming from the NAA 60 and sends back to the NAA 60 another data stream for outgoing information without noticing a transition between two NATs.

The NAA 60 treats outgoing data packets and incoming data packets differently. For an outgoing data packet, if the active adapter is the primary adapter, the data packet is sent unmodified from the NAA 60 to the primary adapter except when there is a special need for encapsulation. If the active adapter is an adapter other than the primary adapter, a hardware frame of the data packet is modified by the NAA so that a source hardware address in the frame is set to the L2 address of the active adapter before data packet is sent to that active adapter.

For an incoming packet, if the receiving adapter is the primary adapter, the data packet is "passed up" unmodified to the NAA 60, except when there is a special need for decapsulation. If the receiving adapter is not the primary adapter, a hardware frame of the data packet is modified so the destination hardware address is set to the L2 address of the primary adapter before the data packet is passed through the NAA 60. This ensures that L3 sees no change in the Anchor (that it detects at all time).

In addition, Address Resolution Protocol (ARP) must be blocked or handled appropriately so that an ARP module of the protocol stack is not confused about a single IP address in L3 with multiple L2 addresses. For instance, in response to an ARP request message sent by a router, a message can be broadcasted to publish the L2 address of the active adapter.

Furthermore, it is important for the NAA 60 to determine which network adapter or NIC is active at any moment. Some NICs and their associated adapter drivers are capable of indicating a connection and disconnection status. Typically, the time required to detect a disconnection detection is around one second and around six seconds to detect connection. These time thresholds are good indicators of the activity status of the NICs. The NAA 60 is thus capable of making use of these hardware status indications to obtain information about which adapter is active.

Also, according to one embodiment of the present invention, the NAA 60 is equipped with a timer that times out on a one-second basis. This timed event is used to detect the existence of incoming data packets. If the NAA 60 detects a data packet for the primary adapter, the primary adapter is deemed the active adapter. If the NAA 60 detects that there is no data packet going through the primary adapter in a period of two seconds, but there is at least one data packet received on a non-primary or a secondary adapter, the secondary adapter is used as the active adapter. An active adapter is viewed by the NAA 60 as active until another active adapter replaces it.

With the implementation of the NAA 60, a user can freely switch from one NAT to another without worrying about disrupting any active network applications. For example, as mentioned above, if a user's laptop is equipped with one Ethernet card and one wireless LAN PCMCIA card, thereby providing for two alternate network access to a corporate network, network application will not be interrupted when the network access is switched from the Ethernet card to the PCMCIA card. The NAA 60 may initially set the Ethernet card as the primary adapter and the PCMCIA adapter as a secondary adapter. While in the middle of downloading a file through the active primary adapter, if the user must go to a meeting in another building, he can simply unplug the Ethernet connection and start on the wireless PCMCIA card. The user is then free to go to the meeting while his laptop continues the downloading session using the wireless LAN connection. The user will be on time at the meeting and be able to finish downloading without any delay.

Further, the NAA 60 can be used in conjunction with Mobile Internet Protocol to allow a mobile device to roam seamlessly between different subnets having different NATs.

Similarly, the present invention also applies to networks using various packet based wireless access technologies. As long as there are at least two different NATs, the present invention preserves the integrity of active network applications while providing smooth transition from one NAT to another.

It is noted that in addition to providing switching between different network access technologies, as mentioned above, the NAA 60 also works in conjunction with other Mobile Internet Protocol functions such as IP-in-IP encapsulation/de-capsulation, proxy ARP, gratuitous ARP, etc.

The above disclosure provides many different embodiments, or examples, for implementing different features of the invention. Also, specific examples of components, and processes are described to help clarify the invention. These are, of course, merely examples and are not intended to limit the invention.

While the invention has been particularly shown and described with reference to the preferred embodiment thereof, it will be understood by those skilled in the art that various changes in form and detail may be made therein without departing from the spirit and scope of the invention.

What is claimed is:

1. A method for switching between two different network access technologies on a networked hardware platform without interrupting an active network application, the platform sending outgoing data packets and receiving incoming data packets for the network application through one of at least two network adapters, the network adapters providing accesses to the network hardware platform for executing the network application, the method comprising the steps of:

providing a network access arbitrator having a virtual anchor adapter driver;

assigning a network adapter, wherein the network adapter is based on a first data link layer network access technology as a primary network adapter;

detecting an active network adapter, wherein the active network adapter is based on the second data link layer network access technology; and configuring, by the network access arbitrator, the data packets generated by the active network application to continue the network application when the access to the network hardware platform is switched from the primary network adapter to the active network adapter driver, wherein the configuring includes changing a source hardware address of an outgoing data packet to a data link layer address of the active network adapter; and modifying a destination hardware address of an incoming data packet to that of the primary network adapter driver prior to sending the data packet to the network application;

wherein the network application detects only the network arbitrator when accessing the networked hardware platform, and wherein the source and destination hardware addresses of the data packet are not changed if the primary network adapter is used.

2. The method of claim 1 wherein the step of assigning further includes the step of initially configuring the virtual anchor adapter driver as the network adapter driver associated with the primary network adapter.

3. The method of claim 1 wherein the step of detecting further includes a step of receiving information from at least one network adapter about connection or disconnection status of the network adapter and its adapter driver.

4. The method of claim 3 further comprising the steps of:
providing a timer to trigger a timed event; and
determining whether at least one adapter receives or sends data packets during two consecutive timed events.

5. The method of claim 1 wherein the step of detecting further includes the step of detecting whether the primary network adapter is active.

6. A method for switching from a first data link layer network access technology to a second data link layer network access technology on a networked hardware platform without interrupting an active network application using a network access arbitrator, the active network application sending outgoing information and receiving incoming information in data packets through the networked hardware platform, the first data link layer network access technology using a first network adapter driver and the second data link layer network access technology using a second network adapter driver, the method comprising the steps of:

utilizing the first data link layer network access technology for executing the active network application;

identifying the first network adapter driver as inactive and the second network adapter driver as active after no packets are received by the network access arbitrator from the first network adapter driver for a predetermined period of time and after at least one packet is received by the network access arbitrator from the second network adapter driver within the predetermined period of time; and selecting the second data link layer network access technology for continuing the active network application without interrupting the network application through the network access arbitrator by arbitrating between the first network adapter driver and the second network adapter driver for sending the outgoing information and receiving the incoming information.

7. The method of claim 6 wherein the network access arbitrator has a virtual anchor adapter driver that is visible to the active network application.

8. The method of claim 7 wherein the step of utilizing further includes the steps of:
selecting the first network adapter as a primary network adapter; and
configuring the anchor adapter driver to be associated with the first network adapter.

9. The method of claim 6 wherein the step of selecting further includes the steps of:
detecting when the second network adapter driver is active; and
modifying a source hardware address of a data packet for the outgoing information to be a data link layer address of the second network adapter driver; and
modifying a destination hardware address of a data packet for the incoming information to be a data link layer address of the first network adapter driver.

10. A system for switching between two different data link layer network access technologies on a networked hardware platform without interrupting an active network application, the platform sending outgoing data packets and receiving incoming data packets for the network application through at least two network adapters, the network adapters providing access to the network hardware platform for executing the network application, the system comprising:

means for assigning a network adapter based on a first data link layer network access technology as a primary network adapter;

means for detecting an active network adapter based on a second data link layer network access technology, wherein the means for detecting include means for identifying the primary network adapter as inactive and the active network adapter as active after no packets are received by a network access arbitrator from the primary network adapter for a predetermined period of time and after at least one packet is received by the network access arbitrator from the active network adapter within the predetermined period of time; and the network access arbitrator having a virtual anchor adapter driver for configuring the data packets generated by the active network application to continue the network application when access to the network hardware platform is switched from the primary network adapter to the active network adapter driver;

wherein the network application detects only the network arbitrator for accessing the networked hardware platform.

11. The system of claim 10 wherein the means for assigning further includes means for configuring the virtual anchor adapter driver initially as the network adapter driver associated with the primary network adapter.

12. The system of claim 10 wherein the network access arbitrator further includes:

means for changing a source hardware address of a data packet for the outgoing information to a data link layer address of the active network adapter; and means for modifying a destination hardware address of a data packet for the incoming information to that of the primary network adapter driver.

13. The system of claim 10 wherein the means for detecting further includes a means for receiving information from at least one network adapter about connection or disconnection status of the network adapter and its adapter driver.

14. A computer program stored on a computer readable medium for switching between two different data link layer network access technologies on a networked hardware platform without interrupting an active network application, the networked hardware platform sending and receiving information in a data packet form, said computer program comprising:

instructions for determining an active network adapter implementing a first data link layer network access technology by monitoring packet traffic and hardware status of one or more network adapters implementing one or more data link layer network access technologies and available on the networked hardware platform; and instructions for dynamically engaging the active network adapter by a network access arbitrator to process at least one data packet, wherein the network access arbitrator defines a virtual anchor adaptor driver that is known as the only adapter driver to the network application regardless of the existence of other actual adapter drivers available in the networked hardware platform;

instructions for assigning a predetermined network adapter as a primary network adapter for providing the network access;

instructions for initially setting the virtual anchor adaptor driver as the network adapter driver associated with the primary network adapter;

instructions for changing a hardware destination address of an incoming data packet to a data link layer address of the primary network adapter prior to sending the data packet to the active network application; and instructions for changing a source hardware address of an outgoing data packet to a data link layer address of the active network adapter, wherein the engagement of the active network adapter is invisible to the active network application and wherein a plurality of data packets are sent by the networked hardware platform over a network via the active network adapter.

15. A method for using a network access arbitrator for switching between at least first and second network adapters using first and second Open Systems Interconnect 7-Layer (OSI-7) network access technologies, respectively, wherein the network access arbitrator defines a virtual anchor adaptor driver that is known as the only adapter driver to a network application, the method comprising:

assigning a predetermined network adapter as a primary network adapter for providing network access;

initially setting the virtual anchor adaptor driver as the network adapter driver associated with the primary network adapter;

determining whether the first or second network access technology is active on the first or second network adapter, respectively, in a physical layer (L1) by monitoring a packet traffic and a hardware status of the first and second network adapters;

receiving a plurality of data packets from the application; and dynamically engaging the active network adapter by the network access arbitrator disposed between a data link layer (L2) and a network layer (L3) to process at least one of the data packets, wherein the engagement of the active network adapter is transparent to the application if the application is disposed in L3 or higher; changing a hardware destination address of an incoming data packet to a data link layer (L2) address of the primary network adapter prior to sending the data packet to the application; and changing a source hardware address of an outgoing data packet to a data link layer (L2) address of the active network adapter.

* * * * *